United States Patent [19]

Hicks

[11] Patent Number: 4,700,583
[45] Date of Patent: Oct. 20, 1987

[54] GEAR MOUNTING
[75] Inventor: Raymond J. Hicks, Powys, Wales
[73] Assignee: Hicks Transmissions Limited, Powys, Wales
[21] Appl. No.: 490,206
[22] Filed: May 2, 1983
[30] Foreign Application Priority Data
   May 1, 1982 [GB] United Kingdom ............... 8212752
[51] Int. Cl.⁴ .......................................... F16H 57/02
[52] U.S. Cl. ................................... 74/410; 74/411; 74/801
[58] Field of Search .......................... 74/411, 410, 801
[56] References Cited
   U.S. PATENT DOCUMENTS

| | | | |
|---|---|---|---|
| 1,719,307 | 7/1929 | Pope, Jr. ................................. | 74/411 |
| 2,127,463 | 8/1938 | Chilton ................................... | 74/410 |
| 3,303,713 | 2/1967 | Hicks ..................................... | 74/410 |
| 3,315,546 | 4/1967 | Fritsh .................................... | 74/801 |
| 3,943,787 | 3/1976 | Hicks ..................................... | 74/411 |
| 3,952,608 | 4/1976 | Kanai et al. ........................... | 74/411 |
| 3,964,334 | 6/1976 | Hicks ..................................... | 74/411 |
| 3,983,764 | 10/1976 | Hicks ..................................... | 74/410 |
| 4,043,216 | 8/1977 | Steer ...................................... | 74/801 |
| 4,090,416 | 5/1978 | Hicks ..................................... | 74/801 |
| 4,121,476 | 10/1978 | Hammond ............................. | 74/411 |

FOREIGN PATENT DOCUMENTS

| | | | |
|---|---|---|---|
| 865409 | 3/1971 | Canada ................................... | 74/801 |
| 0003894 | 9/1979 | European Pat. Off. . | |
| 0093584 | 11/1983 | European Pat. Off. . | |
| 909275 | 7/1949 | Fed. Rep. of Germany ........ | 74/411 |
| 1053412 | 1/1967 | United Kingdom . | |
| 1101131 | 1/1968 | United Kingdom . | |
| 1448059 | 9/1976 | United Kingdom . | |
| 1456085 | 11/1976 | United Kingdom .................. | 74/801 |
| 1508999 | 4/1978 | United Kingdom . | |

Primary Examiner—Leslie Braun
Assistant Examiner—Martin G. Belisario
Attorney, Agent, or Firm—Young & Thompson

[57] ABSTRACT

In a gear mounting having a spindle (10,16,31) extending generally normal to a carrier (5,13,29), the spindle is cantilevered back from the outer end of a tie-bolt (4,14,30) and is permitted limited axial excursions to adapt itself to the tooth loading. It is particularly suited to mounting planets in an epicyclic gear. The outer end of the spindle is clamped between the head of the tie-bolt and a tubular compression member (9,15,32) of lesser axial extent than the spindle, and between that member and the carrier there is a bush (12,17,33), also in the compression chain. The tubular member is more flexible than the bush and the bolt can also flex to allow the axial excursions. The tubular member may be integral with the bush or separate from it, but in either case the geometry of the various components can be such that easy tolerances are permissible to facilitate assembly. However, when the tie-bolt is tensioned distortions occur to close radial clearances and centralize the components. An application of this mounting is to an epicyclic gear in which there are double planets whose parts are of different pitch to give an added reduction.

7 Claims, 7 Drawing Figures

GEAR MOUNTING

This invention relates to gear mountings and is a development of the type described in British Pat. Nos. 1101131, 1456085, 1448059 and 1508999 and in European Pat. Publication No. 0003894. These disclose arrangements allowing a certain freedom of movement of the intermediate gear of a gear train, in particular the planet of an epicyclic. Such gears can take up positions and attitudes dictated by their loading rather than by a rigid carrier.

It is important that the flexible spindle which carries such an intermediate gear should be as compact and as light as possible, particularly in high speed aircraft applications for example. Hitherto the ends of these spindles remote from the carrier have projected axially beyond the planets to quite a substantial extent. Also, the flexing characteristics must be such that when a gear is loaded, the spindle should flex in the correct balanced manner.

It is the aim of this invention to reduce further the dimensions of the spindle, while increasing its flexibility.

According to one aspect of the present invention there is provided a gear mounting having a spindle extending substantially normal to a carrier and capable of radial excursions when under load from an initial unloaded position, the spindle comprising a central tie bolt and a surrounding co-axial tubular assembly under compression by the bolt against the carrier, the bolt being flexible and the tubular assembly including a compression member within the axial span of the gear, capable of contraflexure under load and with its centre substantially coincident with the centroid of that load, and a comparatively rigid bush interposed between that compression member and the carrier.

This arrangement allows the tie bolt to be relatively longer and therefore more flexible in relation to the compression member than previously, and yet it does not have to project substantially, if at all, beyond the end of the gear remote from the carrier. Thus the overall axial dimension is reduced and the structure is less massive.

The extra interface now provided between the bush and the compression member gives further scope for flexure, and the movement at the contact areas at the ends of that member probably contributes more to the flexibility than the compression member itself.

The gear will generally be carried by a cantilevered bearing sleeve having an inwardly projecting rib trapped in the compression chain, between the head of the bolt and the compression member. It will otherwise freely surround the spindle, as described in the earlier Patents. Although its inner end may trap an oil seal and/or an O-ring against the bush, the sleeve will be free to move radially.

According to another aspect of the present invention there is provided a gear mounting having a spindle extending substantially normal to a carrier and capable of radial excursions when under load from an initial unloaded position, the spindle comprising a central tie bolt and a surrounding co-axial tubular member under compression by the tie bolt against the carrier, the bolt being flexible and the tubular compression member having a first axial portion relatively thin and flexible compared with a second axial portion which abuts the carrier, the first axial portion being capable of contraflexure under load and the member being so profiled that when load is applied to a gear on the spindle the gear moves substantially parallel to itself.

This arrangement may be regarded as a modification of the first aspect of the invention, combining the compression member and the bush into a single asymmetric member whose shape is calculated to compensate for the lack of interface and for the asymmetric couples at the ends.

In a development of these, the spindle carries two united gears of different pitch, and in an epicyclic arrangement there may be three or more of these double gears in a planet system. One of each pair will mesh with a sun and the other with an annulus to create a reduction train with the torque split evenly through the double planets. At the end remote from the carrier, the planets may be mutually supported by a floating ring co-axial with the sun and annulus but in rolling engagement only with those planets. This ring will be positioned such that the unequal and axially offset radial loads at the sun and annulus mesh points will be balanced. The centroid of the tangential loads on each double planet will be arranged to be at the midpoint of the compression member forming part of its flexible spindle. The advantages of this arrangement will be explained later.

For a better understanding of the invention, some embodiments will now be described, by way of example, with reference to the accompanying drawings, in which.

Figure 1:
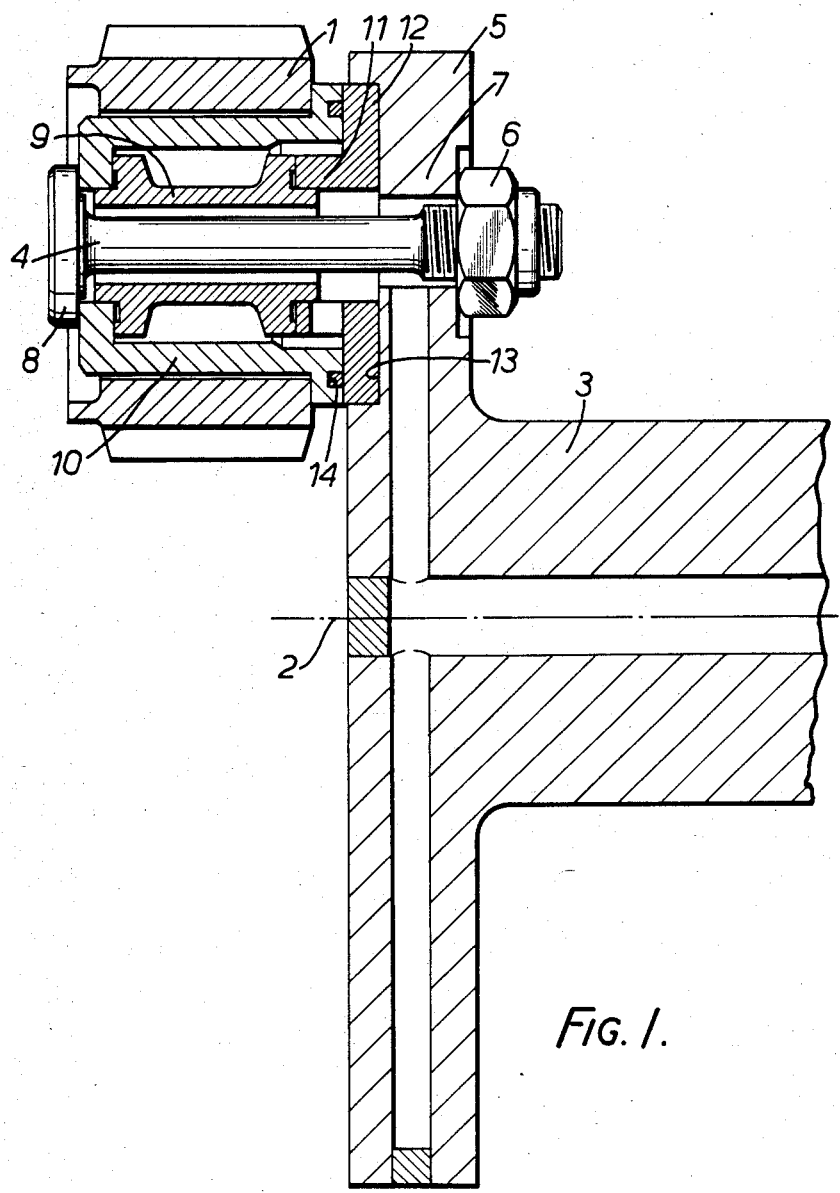
FIG. 1 is an axial section of part of an epicyclic gear.

In FIG. 1, a planet 1 will mesh externally with an annulus and internally with a sun, neither of these other gears being shown for simplicity. Also, there will be several planets 1 in a symmetrical arrangement about the common axis 2 of the sun and annulus.

The planet 1 is mounted on a carrier 3 by a flexible spindle assembly which is a development of that described in the above mentioned Patents. Such an arrangement allows certain freedom of movement of the planet, which takes up a position and attitude dictated by its loading rather than by the rigid carrier 3. In the present arrangement, a tie-bolt 4 extends normally from a radial flange 5 of the carrier, its securing nut 6 bearing against the reverse side of a thinner diaphragm portion 7, and its head 8 being substantially flush with the outer end of the planet 1. The shank of the bolt 4 is freely surrounded by a tubular compression member 9, which at its outer end sandwiches an in-turned flange of a bearing sleeve 10 against the underside of the head 8, and which at its inner end abuts the end face of a spigot 11 axially projecting from a bush 12. This is seated in an annular recess 13 in the carrier flange 5, and the inner end of the sleeve 10 closely co-operates with it, although it is free to move in the radial plane, a bearing ring being housed in an annular groove 14 in its inner end face.

It will be seen that when the nut 6 is tightened the bearing sleeve 10 will be held securely, and that the member 9 will be under compression. Its reduced thickness central portion will allow it to flex in the manner described, for example, with reference to FIG. 2 of the European publication mentioned above, while the tie-bolt 4 bends from a point near the nut 6.

The bush 12 is considerably more rigid in terms of its second moment of area than the compression member 9. Its deflection will be negligible and not enough to upset the balance of angular deflection occurring at either end. Its presence enables the head of the bolt to be brought in nearer the carrier 3, thus reducing the axial dimension of the assembly, while effectively making the flexible tie-bolt longer in relation to the compression member 9, which is now of less axial extent than the gear. The lateral and axial flexibility of the tie-bolt are considerably increased, therefore reducing superimposed bending stresses in the tie. The dimensional reductions assist in offsetting the unbalancing effects of centrifugal loads and in minimising the overall size and weight of the gearbox, which is particularly important in aircraft applications.

Furthermore, by putting diametrical spigots on the compression member in the way shown, the spindle and carrier are much simpler and cheaper to machine and the drilling of lubrication passages is also facilitated.

Figure 2:
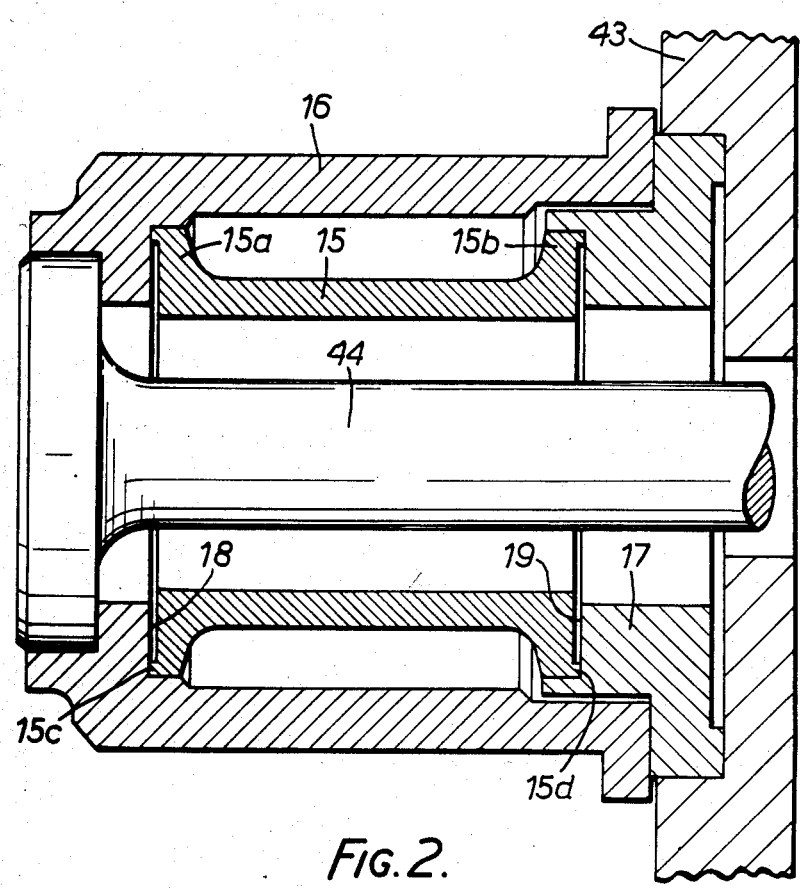
FIG. 2 is an axial section of part of another epicyclic gear.

In FIG. 2 the arrangment is generally similar, with the carrier referenced 43, the tie-bolt 44, the compression member 15, the bearing sleeve 16 and the bush 17. The difference lies in the structure of the compression member 15 and its co-operation with carrier 43 and bush 17.

Figure 3A:
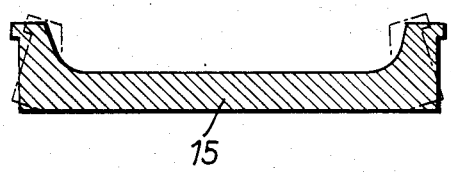
FIGS. 3($a$–$d$) is a set of diagrams for explaining the action of FIG. 2.

Instead of the ends of the compression member having integral male spigots engaging with through bores in the bearing sleeve and bush respectively as in FIG. 1, these are eliminated, leaving radially outwardly extending flanges 15a and 15b which are in effect diaphragms. Their outer cylindrical surfaces engage in inwardly facing co-radial annular rebates 18 and 19 formed in the sleeve 6 and bush 17, while the end faces of the member 15 themselves have machined out rebates leaving outer annular rings 15c and 15d which abut the radial faces of the rebates 18 and 19. There are several advantages in this especially in larger spindles where the recesses are easier to machine. Also, when the axial tie load is applied the diaphragms 18 and 19 tend to "umbrella" as indicated in much exaggerated fashion by the broken lines in FIG. 3(a). This radially expands the outer cylindrical surfaces of the flanges 15a and 15b and takes up any initial clearance between them and the rebates 18 and 19 respectively.

Figure 3B:
Figure 3C:
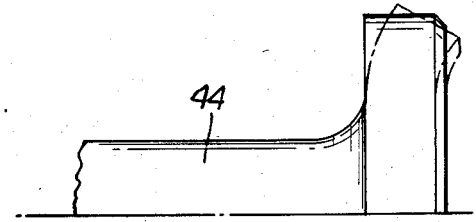
Figure 3D:
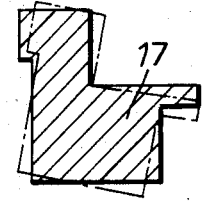

As seen in FIGS. 3(b) and 3(c) corresponding distortion occurs at the outer end of the sleeve 16 and at the head of the bolt 44 which is received in an annular rebate in that outer end, while FIG. 3(d) shows the distortion of the bush 17. The surface of the bush which co-operates with the diaphragm of the carrier 43 is a somewhat enlarged version of the ends of the member 15 and its distoriton is similar. These movements, although less marked than those of the ends of the member 15, cause the various opposed surfaces to move towards one another and provide mutual contact and support.

This reduces errors by taking up the radial clearances which this construction allows to be provided between mating surfaces for easier assembly, and it automatically centralizes the various members with respect to one another. It is also expected to reduce the tension required in the tie-bolt and thereby reduce its diameter and increase its flexibility. The buttressing effects also limit the umbrella action when lateral planet loads are applied so that diaphragm stresses are reduced accordingly.

These arrangements may be further modified by not having distinct compression elements and bushes, but uniting them in a single member. However, this is not a complete reversion to the constructions described in the earlier patents referred to, since this member would not be symmetrical. It would have a contraflexing tubular portion extending from a relatively rigid end portion corresponding to the bush 12 or 17.

These constructions can also be followed in the embodiment of FIG. 4, which also has other features which will now be described.

Figure 4:
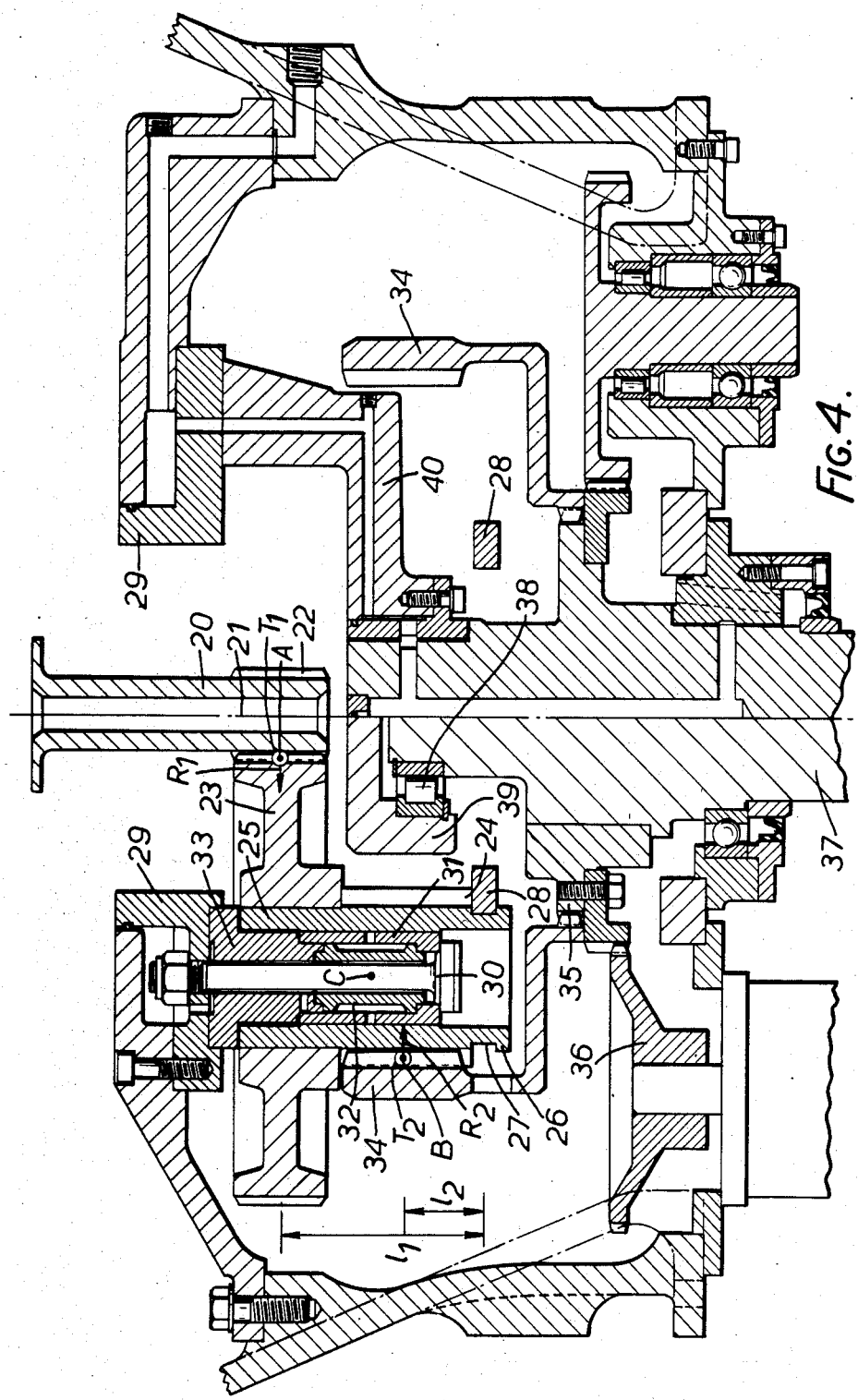
FIG. 4 is an axial section of a further epicyclic gear.

In FIG. 4, an input shaft 20, with axis 21, is formed at one end with a sun gear 22. This meshes with a first, large diameter planet 23 which is united with a second, small diameter planet 24, the latter having a cylindrical axial extension 25 over which the boss of the planet 23 fits. At the opposite axial end the planet 24 has another cylindrical extension 26 with a shallow, external annular groove 27. A rolling ring 28 engages in this groove at the zone most adjacent the axis 21, the ring being co-axial with the shaft 20 and co-operating similarly with all the other planets (not shown) of the assembly. It is not otherwise supported and is thus "floating". Its function will be described later.

The double planets 23, 24 are each mounted on a fixed carrier 29 by means of a tie-bolt 30, cantilevered bearing sleeve 31, tubular compression member 32 and bush 33 in an arrangement similar to FIG. 1, although here the spigot of the bush is somewhat extended, and the inner end of the bearing sleeve 31 co-operates with a shoulder formed in this spigot. Thus the sleeve 31 and the compression member 32 are very considerably shorter than the tie-bolt 30, and surround the outer end portion of its shank. The head of the tie-bolt is well recessed inside the planet 24. It might be further modified to follow FIG. 2.

The planet 24 engages an annulus 34, which in turn drives an output gear 35 and thence a further gear 36 for accessory drives and a main output shaft 37. The end of this shaft 37 adjacent the epicyclic is carried by a bearing 38 supported by a fixed boss 39. This is mounted on the carrier 29 by means of angled arms 40 interposed between the planets, the boss 39 and arms 40 resembling a spider between whose legs the planets rotate. These arms, as will be apparent from the following, are not required to provide any support for the relatively high planet loads.

This gear assembly offers a reduction via three matching lay shafts (assuming there are three planets) in a uniform load sharing arrangement. Referring to the double planets 23, 24 shown, there will be resultant radially outward and upward tangential loads $R_1$ and $T_1$ on the large diameter planet 23 at point A (pitch diameter $d_1$), while there will be radially inward and upward tangential loads $R_2$ and $T_2$ on the smaller planet 24 at point B (pitch diameter $d_2$). The respective axial distances of A and B from the central plane of the ring 28 are $l_1$ and $l_2$. The geometry is such that the centroid of the two upward tangential loads $T_1$ and $T_2$ is at the mid-point C of the compression member 32, while the rolling ring 28 is located in such a position that it balances the purely radial components $R_1$ and $R_2$ and the relationship $R_1 \times l_1 = R_2 \times l_2$ holds. Since the radial tooth loads are inversely proportional to their pitch diameters:

$$R_1 d_1 = R_2 d_2$$
and so $$l_1/d_1 = l_2/d_2$$

If the tangential loads $T_1$ and $T_2$ stray from points A and B, this creates the tendency of the planet to tilt in either or both tangential and radial directions. For example, if due to torsional wind-up of the sun 22, the load tends to be heavier at the input end, both the centroid of the combined tangential loads and the associated radial couple are not in equilibrium until the planet tilts first tangentially and then radially to return the respective planet tooth loads to the middle of their faces. This is permitted by the flexible cantilever planet spindle, which allows its planet to take up any attitude.

Thus uniform load sharing is achieved not only between adjacent planets, but also across the respective sun and annulus mesh points. Furthermore, compared with a conventional two-stage, parallel shaft gear, the three symmetrically arranged mesh points in each stage of this transmission virtually eliminate the high speed bearing problem and reduce bearing losses to a very low level. Also, by splitting the torque into three paths or more in this manner a very compact transmission is obtained.

I claim:

1. A gear mounting having a carrier, a cantilever spindle extending substantially normal to the carrier and capable of radial excursions from an initial position when under load, the spindle comprising a central flexible tie bolt, a surrounding co-axial symmetrical flexible tubular member under compression by the bolt against the carrier, a bearing sleeve for a gear cantilevered back from the outer end of the spindle remote from the carrier and freely surrounding the tubular compression member, the flexure of the tubular member under a load whose resultant is transverse to it and through its centre being such that it assumes a configuration where the outer end portion is parallel to but offset from the inner end portion, and a bush, rigid in comparison with the bolt and compression member, interposed and positively located between that compression member and the carrier, one outwardly flanged end of the compression member being received in an annular recess in the bush defined by a cylindrical wall and a radial wall, the flange being formed so that, when the tie bolt is tensioned, urging said flanged end of the compression member against the radial wall, said end is distorted to take up any radial clearance between itself and the cylindrical wall of the recess.

2. A gear mounting as claimed in claim 1, wherein the end of the sleeve has a recess which receives the head of the tie-bolt, these parts being capable of distortion, when the tie-bolt is tensioned, to take up any radial clearance between the head and the cylindrical wall of the recess.

3. A gear mounting as claimed in claim 1, wherein the spindle is for the planet of an epicyclic train.

4. A gear mounting as claimed in claim 1, wherein the spindle carries two united gears of different pitch, the resultant of tangential tooth loads passing through the mid-point of the compression member.

5. A gear mounting as claimed in claim 3, wherein the planets at their outer ends are mutually supported by an internal common rolling ring co-axial with the sum of the epicyclic train and annulus.

6. A gear mounting as claimed in claim 1, wherein the end of the compression member remote from the carrier is similarly flanged and co-operates in like manner with a recess in the adjacent end of the sleeve.

7. A gear mounting as claimed in claim 1, wherein the portion of the bush which co-operates with the carrier is received in an annular recess defined by a cylindrical wall of greater radius than the first mentioned cylindrical wall and a radial wall, the bush being capable of distortion, when the tie-bolt is tensioned urging the bush against the associated radial wall, to take up any radial clearance between itself and the cylindrical wall of the carrier recess.

* * * * *